United States Patent
Arora et al.

(10) Patent No.: US 12,126,595 B2
(45) Date of Patent: Oct. 22, 2024

(54) HARDWARE FIREWALLS WITH ADAPTIVE DENY-BY-DEFAULT (DBD) ACCESS CONTROL

(71) Applicant: NXP USA, Inc., Austin, TX (US)

(72) Inventors: Mohit Arora, Austin, TX (US); Lawrence Loren Case, Austin, TX (US); Joseph Charles Circello, Phoenix, AZ (US); Michael Charles Elsasser, Austin, TX (US)

(73) Assignee: NXP USA, Inc., Austin, TX (US)

( * ) Notice: Subject to any disclaimer, the term of this patent is extended or adjusted under 35 U.S.C. 154(b) by 395 days.

(21) Appl. No.: 17/456,911

(22) Filed: Nov. 30, 2021

(65) Prior Publication Data

US 2023/0171229 A1    Jun. 1, 2023

(51) Int. Cl.
*H04L 9/40* (2022.01)
*G06F 15/78* (2006.01)
*G06F 21/79* (2013.01)

(52) U.S. Cl.
CPC ...... *H04L 63/0263* (2013.01); *G06F 15/7807* (2013.01); *G06F 21/79* (2013.01); *H04L 63/029* (2013.01); *H04L 63/20* (2013.01)

(58) Field of Classification Search
CPC .................................................. H04L 63/0263
See application file for complete search history.

(56) References Cited

U.S. PATENT DOCUMENTS

| | | | | |
|---|---|---|---|---|
| 5,898,830 | A * | 4/1999 | Wesinger, Jr. | H04L 61/35 709/227 |
| 7,644,436 | B2 * | 1/2010 | Izatt | H04L 63/10 709/224 |
| 8,555,370 | B2 * | 10/2013 | Ellis | H04L 9/40 713/153 |
| 11,093,641 | B1 * | 8/2021 | Whalen | G06F 16/906 |
| 2010/0189262 | A1 * | 7/2010 | Ducharme | H04N 21/4183 706/47 |
| 2014/0380405 | A1 * | 12/2014 | Forsberg | H04L 63/20 726/1 |
| 2017/0295140 | A1 * | 10/2017 | Glazemakers | H04L 63/101 |
| 2018/0095668 | A1 * | 4/2018 | Malyugin | G06F 12/0888 |
| 2020/0293485 | A1 * | 9/2020 | Kim | G06F 1/3206 |
| 2020/0314145 | A1 * | 10/2020 | Bolignano | H04L 63/20 |
| 2020/0329047 | A1 * | 10/2020 | Powers | H04L 63/102 |
| 2021/0196406 | A1 * | 7/2021 | Mahadik | G06F 21/6218 |

(Continued)

*Primary Examiner* — Ponnoreay Pich

(57) ABSTRACT

In an embodiment, a System-on-Chip (SoC) may include: a plurality of core domains, and a memory coupled to the plurality of core domains through a hardware firewall, wherein the hardware firewall is configured to enforce an adaptive Deny-By-Default (DBD) access policy in response to an event. In another embodiment, a circuit, may include: an access control policy generator configured to produce an adaptive DBD policy, and a hardware firewall coupled to the access control policy generator, the hardware firewall configured to enforce the adaptive DBD policy. In yet another embodiment, a method may include: storing an indication of a first DBD configuration state, the first DBD configuration state usable to enforce a first DBD access control policy, and changing the stored indication to a second DBD configuration state, the second DBD configuration state usable to enforce a second DBD access control policy.

18 Claims, 2 Drawing Sheets

(56) References Cited

U.S. PATENT DOCUMENTS

| | | | |
|---|---|---|---|
| 2022/0103594 A1* | 3/2022 | Galloway | H04L 63/205 |
| 2022/0191206 A1* | 6/2022 | Cook | H04L 41/0627 |
| 2022/0276984 A1* | 9/2022 | Fu | G06F 12/12 |
| 2022/0337604 A1* | 10/2022 | Kim | H04L 63/0281 |
| 2023/0171229 A1* | 6/2023 | Arora | G06F 21/74 726/11 |

* cited by examiner

HARDWARE FIREWALLS WITH ADAPTIVE DENY-BY-DEFAULT (DBD) ACCESS CONTROL

FIELD

This disclosure relates generally to electronic circuits, and more specifically, to systems and methods for hardware firewalls with adaptive Deny-By-Default (DBD) access control.

BACKGROUND

Mechanisms for implementing access control using hardware firewalls are well-known in the embedded compute space. Typically, a hardware firewall is disabled at every reset and explicitly programmed upon startup. After being fully programmed and enabled, the hardware firewall checks memory transactions for: (a) correct access mode, and/or (b) read, write, and execute permissions associated with each addressed memory space.

From the time it is powered on and until its programming is complete, a conventional hardware firewall applies a fixed access control mechanism (e.g., by typically enforcing an "allow all" or "deny all" policy) indiscriminately to all memory transactions.

The inventors hereof have recognized, however, that fixed access controls are undesirable in many applications, especially those that require more complex settings, different operating modes, or specific wakeup requirements. To address these, and other concerns, the inventors hereof have developed mechanisms for hardware firewalls with adaptive Deny-By-Default access controls.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Systems and methods for hardware firewalls with adaptive Deny-By-Default (DBD) access controls are disclosed. The term "hardware firewall," as used herein, refers to electronic circuitry configured to enforce access permissions for one or more memory resources or regions within a microchip. In operation, a hardware firewall enables the isolation (or sharing) of destination memory locations with respect to selected processing core(s) or bus master(s).

Particularly, systems and methods described herein enable the creation and management of default access control "tunnels" that provide a set of specific processing cores or bus masters with access to selected components of a microchip during reset or power state change events, while at the same time restricting or denying access to all other cores and bus masters.

In various implementations, these systems and methods may significantly and securely reduce wake-up times after a reset or low-power mode exit event (e.g., compared to the application of a "deny all" policy), at least in part, by enabling tunneling rules in a hardware firewall. The hardware firewall may be configured to enforce an adaptive DBD access control policy with changeable tunneling rules that grant a prescribed type of access to a selected core(s) or bus master(s) to the exclusion of all other cores or bus masters.

The adaptive DBD access control policy may change depending upon a microchip's lifecycle. By making the default access control adaptive, enforcement of a DBD policy becomes more useful and test friendly. For example, when a device is in a manufacturing stage of its lifecycle, default access controls may be such that a production tester has access to certain test features but no access to security-sensitive areas. Once the device reaches an in-field lifecycle stage, these default access controls may be changed so that a system initiator may be granted access to features that enable it to sequence the power, reset, and clock, while again not having access to protected regions.

Figure 1:
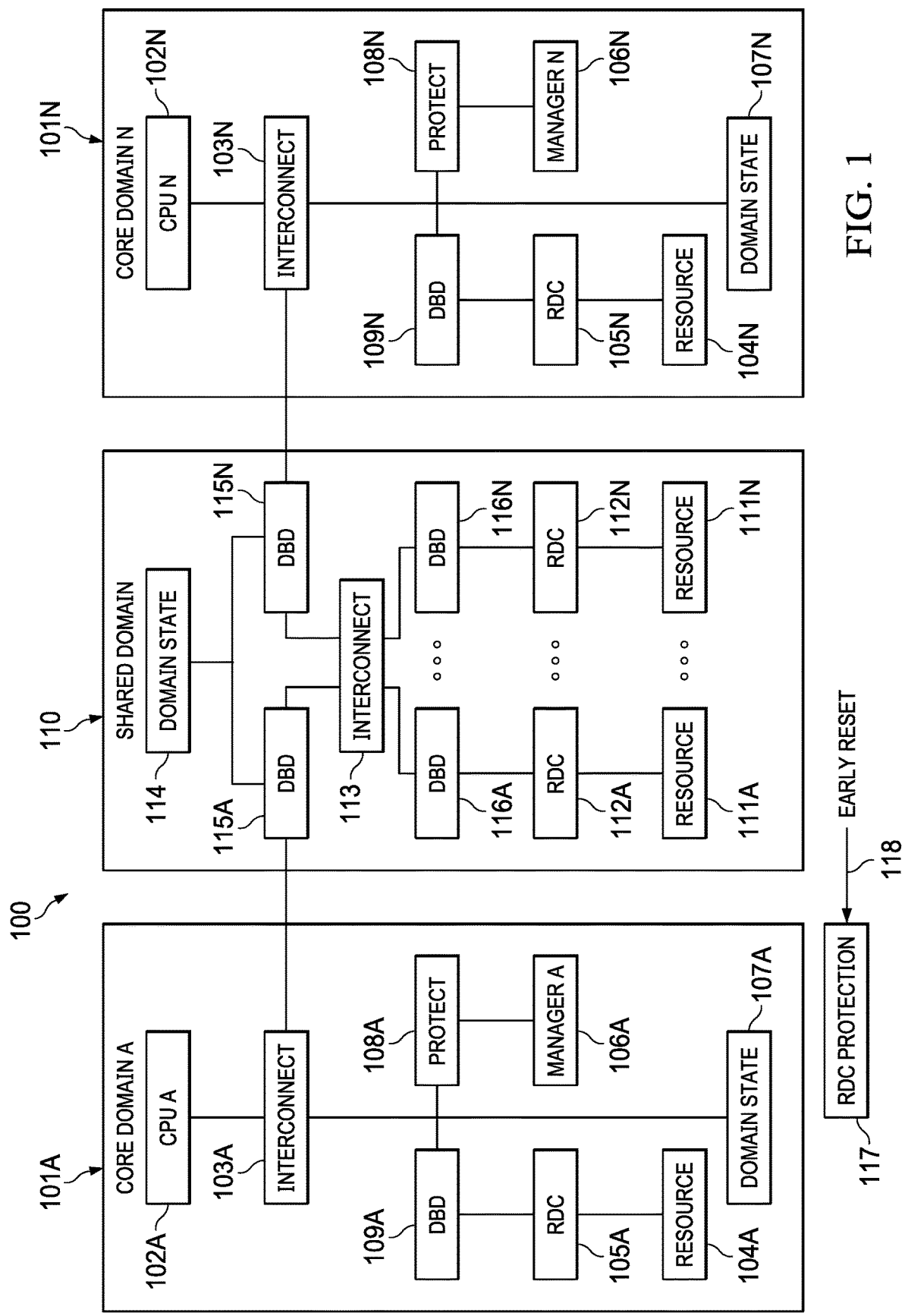
FIG. 1 is a block diagram of an example of a microchip having multiple processing domains and one or more hardware firewalls configured to implement adaptive Deny-By-Default (DBD) access controls, according to some embodiments.

FIG. 1 is a block diagram of an example of microchip 100 with multiple processing domains and one or more hardware firewalls configured to implement adaptive DBD access controls, according to some embodiments. In various applications, microchip 100 may be implemented as a System-on-Chip (SoC), Field-Programmable Gate Array (FPGA), Application-Specific Integrated Circuit (ASIC), or the like.

Microchip 100 includes core domains 101A-N and shared domain 110. The term "domain," as used herein, refers to a logical collection of resources (e.g., cores, peripheral devices, memories, etc.) within microchip 100. Each of core domains 101A-N includes a respective one or more of: Central Processing Units (CPUs) 102A-N, interconnects 103A-N (e.g., a bus, a crossbar, a Network-on-Chip component, etc.), assets or resources 104A-N (e.g., a memory, an Input/Output or "I/O" component, etc.), and hardware firewalls 105A-N (e.g., Resource Domain Controllers or "RDCs").

In some cases, each of core domains 101A-N may implement a discrete application domain. For example, core domain 101A may be a real-time processing domain under control of a Root-of-Trust (RoT) device, whereas core domain 101N may be an application domain running a LINUX or ANDROID Operating System (OS). In each of core domains 101A-N, CPUs 102A-N may include any suitable microcontroller, microprocessor, digital signal processor (DSP), Application-Specific Instruction Set Processor (ASIP), or the like.

Also, within each of core domains 101A-N, a respective one of hardware firewalls 105A-N provides access control operations protecting a corresponding one of assets or resources 104A-N. Manager 106A generates and handles a default access control policy to be enforced by hardware firewall 105A upon a reset or low-power mode exit event with respect to transactions targeting security assets or resources 104A until hardware firewall 105A is fully programmed. Similarly, manager 106N generates and handles a default access control policy to be enforced by hardware firewall 105N with respect to transactions targeting security assets or resources 104N until hardware firewall 105N is fully programmed.

In addition to the components shown in FIG. 1, shared domain 110 may also include additional resources (other than a CPU) that appear as master to interconnect 113. An example of such a resource may include, but it is not limited to, a device with Direct Memory Access (DMA) capabilities, such as a Graphical Processing Unit (GPU), or the like.

With respect to microchip 100, there would be no special security implications if the application of access control policies were exclusively confined to each discrete domain. However, because shared domain 110 allows shared resources 111A-N to become part of a given one of core domains 101A-N when so programmed, its presence increases the security attack surface of microchip 100.

For example, although hardware firewalls 112A-N within shared domain 110 are programmed by either core domain 101A or core domain 101N, if hardware firewalls 112A-N were configured as "allow all" by default, any domain going through a power cycle would temporarily lose its firewall programming and allow unrestricted access to shared resources 111A-N. On the other hand, if hardware firewalls 112A-N were configured as "deny all" by default, any domain going through a power cycle would block all access to shared resources 111A-N until hardware firewalls 112A-N were fully reprogrammed, and therefore would extend the wake-up time, sometimes unnecessarily.

Accordingly, in various implementations, core domain 101A may be configured to identify a corresponding domain state 107A, to use the status of domain state 107A to set manager 106A in protected mode 108A, and to use the status of domain state 107A to set hardware firewall 105A in adaptive DBD mode 109A.

Similarly, core domain 101N may be configured to identify a corresponding domain state 107N, to use the status of domain state 107N to set manager 106N in protected mode 108N, and to use the status of domain state 107N to set hardware firewall 105N in adaptive DBD mode 109N. In some cases, domain states 107A-N (e.g., indicative of a reset or wake-up process) may be identified by RDC protection circuitry 117 coupled to early reset indication 118.

Shared domain 110 may be configured to identify a corresponding domain state 114, and to use domain state 114 to apply: adaptive DBD policy 115A to transactions arriving from core domain 101A, and adaptive DBD policy 115N to transactions arriving from core domain 101N. Moreover, hardware firewall 112A may be configured to use domain state 114 to apply adaptive DBD policy 116A to transactions targeting shared resources 111A, and hardware firewall 112N may be configured to use domain state 114 to apply adaptive DBD policy 116N to transactions targeting shared resources 111N.

Generally, each of hardware firewalls 105A-N and/or 112A-N may enforce a different adaptive DBD policy 109A-N and/or 116A-N uniquely configured by the domain it belongs and/or to each specific resource 104A-N and/or 111A-N it is intended to protect or secure. In some cases, however, two or more of adaptive DBD policies 109A-N and 116A-N may be identical to each other.

Each of adaptive DBD policies 109A-N and/or 116A-N may include one or more tunneling rules that allow selected memory transactions to pass through by default, for example, during boot, while all other memory transactions are denied. Allowed memory transactions may be selected to mitigate the (re)programming times of hardware firewalls 105A-N and/or 112A-N following reset or low-power mode exit of its respective domain 101A-N and/or 110 depending, at least in part, upon a lifecycle stage of microchip 100 (e.g., manufacturing, in-field, repair, etc.) or of a device that includes microchip 100.

Figure 2:
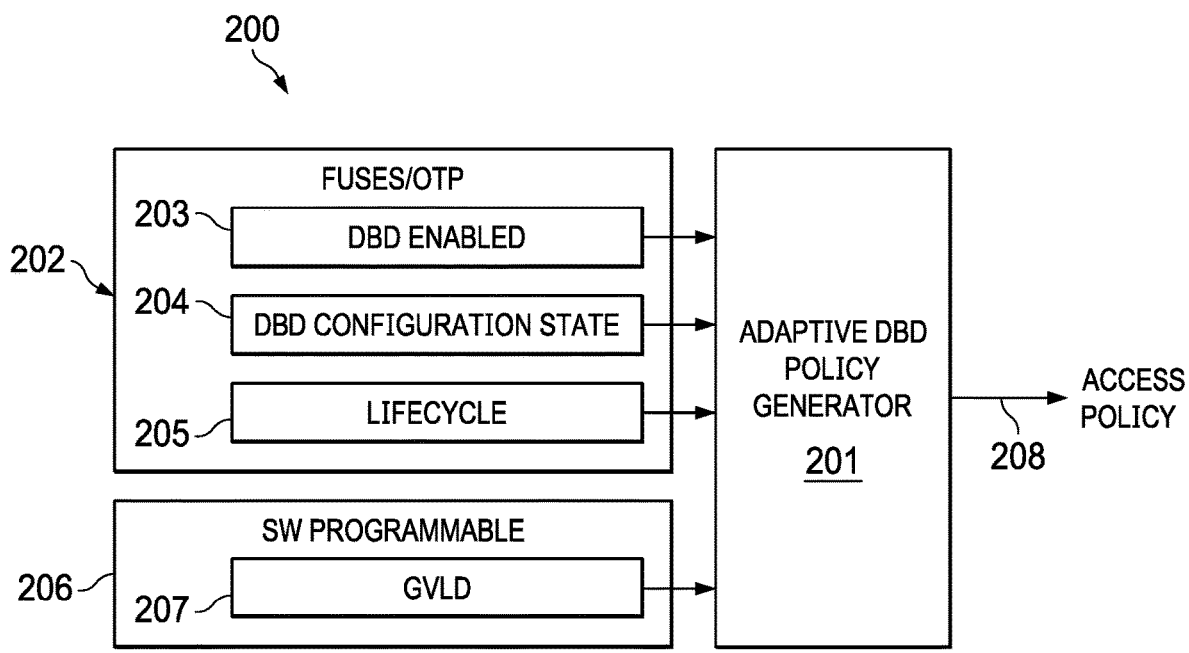
FIG. 2 is a block diagram of an example of an adaptive DBD policy generator, according to some embodiments.

FIG. 2 is a block diagram of an example of adaptive DBD policy generator 201. In some embodiments, a different instance of circuitry 200 having its own adaptive DBD policy generator 201 may be provided in each of managers 106A-N. In other embodiments, adaptive DBD policy generator(s) 201 may be part of a secure enclave, hardware Root-of-Trust (RoT), or the like.

In operation, adaptive DBD policy generator 201 generates a default adaptive DBD access control policy 208 based, at least in part, upon: DBD enabled state bit 203, DBD configuration state bits 204 (e.g., 4 bits), microchip lifecycle stage bit(s) 205, and/or Global Valid (GVLD) state bit 207. DBD enabled state bit 203, DBD configuration state bits 204, and microchip lifecycle stage bit(s) 205 may be implemented as fuses or One-Time Programmable (OTP) memory 202. In some implementations, the same Application Programming Interface (API) that provides access to security functions of microchip 100 may also be used, for example, to program device fuses/OTP memory 202.

GVLD state bit 207 may be programmed by software 206, for example, in a random-access memory (RAM), Electrically Erasable Programmable Read-Only Memory (EEPROM), flash memory, or the like. Software 206 sets the value of GVLD state bit 207 to indicate that hardware firewalls 105A-N and/or 112A-N are fully programmed, and that from that point on explicitly programmed access control policies are enforced.

Prior to that point in time, while the value of GVLD state bit 207 indicates that hardware firewalls 105A-N and/or 112A-N have not yet been fully programmed (e.g., during a reset or wake-up process), so long as DBD enabled state bit 203 is set, adaptive DBD policy generator 201 generates default adaptive DBD access control policy 208 using tunneling rules associated with DBD configuration state bits 204 and/or microchip lifecycle stage bit(s) 205.

An adaptive DBD policy, as described herein, may add at least two more control states that moderate the default DBD access policy, as shown in Table 1 below:

TABLE 1

| DBD ENABLED BIT | DBD CONFIGURATION STATE BITS | GVLD STAGE BIT | DEFAULT ACCESS POLICY |
| --- | --- | --- | --- |
| 0 | (any value) | "Valid" | Default "allow all" accesses until GVLD is programmed as 1. |
| 1 | "Valid" | (any value) | Default "deny all" accesses, except as indicated in tunneling rule(s) associated with the DBD Configuration State. |

DBD enabled state bit 203 determines if DBD mode is enabled out of a reset or low-power mode exit event. If a corresponding fuse is not blown (DBD enabled state bit 203=0), the associated hardware firewall does not monitor any accesses and transactions until its checkers are fully programmed and GVLD state bit 207 is enabled by software 206. During the time from the negation of reset until GVLD state bit 207 is set, all accesses and transactions are allowed.

If the corresponding fuse is blown (DBD enabled state bit 203=1), however, the associated hardware firewall enters an adaptive DBD mode as soon as reset negates. In this mode, all accesses are denied by default, except for the resources that are expressly allowed per the DBD configuration state bits 204. In some implementations, the hardware firewall may terminate any denied memory accesses with bus errors.

DBD configuration state bits 204 may enforce specific tunneling or exception policies when DBD mode is enabled (DBD enabled state bit 203 is set). As an example, consider the illustrative, non-limiting implementation of Table 2:

TABLE 2

| DBD CONFIGURATION STATE BITS ([3:0]) | TUNNELING RULE |
|---|---|
| "0000" | Not in DBD Window |
| "1000" | SROT + Core1[Sec] |
| "1001" | SROT + Core1 |
| "1010" | SROT + Core2[Sec] |
| "1011" | SROT + Core2 |
| "1100" | SROT + Core1[Sec] + Core2[Sec] |
| "1110" | SROT |
| "1111" | All accesses denied |

Where "SROT" represents memory transactions issued by a Secure Root-of-Trust device, often implemented in a secure enclave (representing a mode of the transaction that comes from the secure enclave or a hardware root of trust that is inherently secure), "core1" represents transactions issued by CPU 102A, "core1[Sec]" represents transactions issued by CPU 102A operating in a high-security mode, "core2" represents transactions issued by CPU 102N, and "core2[Sec]" represents transactions issued by CPU 102N operating in a high-security mode.

Unless excepted by the applicable tunneling rule, all memory transactions are denied by default. For example, when DBD configuration state bits 204 indicate "1010" with DBD enabled state bit 203 set to 1, all accesses are denied except accesses that are sourced from an SROT device or by CPU 102N operating in a high-security mode (e.g., ARM's Trust Zone "Secure World"). In some cases, the tunneling rules of Table 2 may be ordered by increasing level of security, such that fewer types of requests (e.g., by issuing entity of core) are allowed, and/or more types of transactions are rejected, as more DBD configuration state bits 204 are written into fuses/OTP 202.

In some cases, a tunneling rule may be of general application, as shown in Table 2. In other cases, a tunneling rule may be bound to a microchip's lifecycle stage (e.g., where no cores are allowed to run, known as "tester" lifecycles). For example, in a lifecycle-based tunnel set there may be two distinct policies for each tunneling rule, one for when the cores are active and the other for when the test ports are active.

In addition to enabling selected core domains to have default accesses based on security policies that may vary from one application to another, systems and methods described herein may also reduce wake-up times, an important requirement in applications where the entire microchip 100, or any of its various domains 101A-N and 110, can enter and exit low-power modes multiple times within a short window of time (e.g., Internet-of-Things (IoT) devices, personal wearables, etc.). The overall power dissipation of these of devices is a key customer requirement, and the reduction of entry and exit times associated with power mode transitions is an important contributing factor to maximize the time spent in powered-down and/or sleep states.

Using the systems and methods described herein, the startup processes involved in exiting from a low-power mode may be performed by a specific core in secure mode, as prescribed by DBD configuration state bits 204. For example, if core domain 101N is assigned to "Application Domain or Linux" running ARM's Trusted Firmware or Secure World Firmware, DBD configuration state bits 204 may be set to "1010" to allow only CPU 102N, running trusted firmware, to have default access to a resource protected by a hardware firewall when exiting from low-power mode. This means that hardware firewalls do not need to be fully re-configured or reprogrammed before certain operations take place, thus reducing wake-up times.

Figure 3:
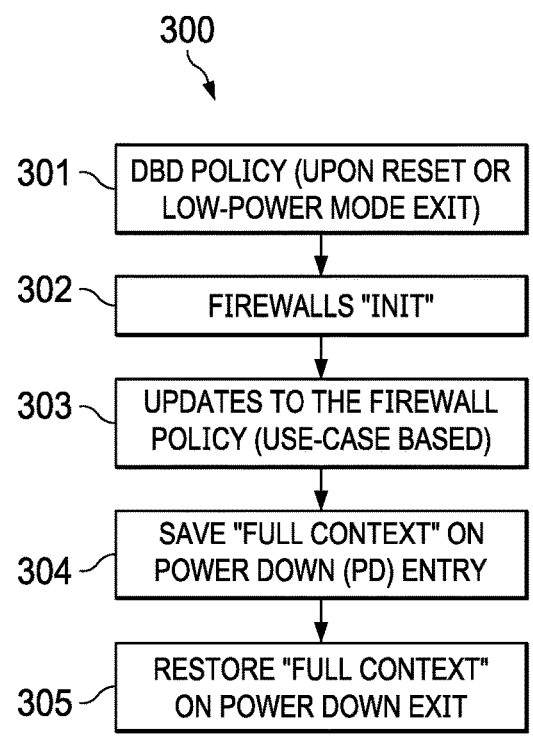
FIG. 3 is a flowchart of an example of a method for enforcing an adaptive DBD policy, according to some embodiments.

FIG. 3 is a flowchart of an example of method 300 for enforcing adaptive DBD policy 208. Particularly, method 300 illustrates how security or control access policies may be handled by microchip 100 and/or its individual core domains 101A-N or 110 during reset, boot, and/or when exiting from low-power modes.

During a boot phase, block 301 generates adaptive DBD policy 208 upon reset or low-power exit (or "wakeup") event. Hardware firewalls 105A-N and/or 112A-N are initialized at block 302 and updated with adaptive DBD policy 208 at block 303. Before a power event (e.g., a reset, entering a power saving mode, etc.), block 304 saves the full context of microchip 100 (or relevant core domain(s) 101A-N or 110). Then, upon microchip 100 (or relevant core domain(s) 101A-N or 110) exiting from the low-power mode and/or when waking up from a reset operation, block 305 restores the full context of microchip 100 (or relevant core domain(s) 101A-N or 110).

It may be noted that, in the absence of systems and methods described herein, microchip 100 (e.g., SROT) would have to perform the full context save of block 304 (prior to low power entry) and the full context restore of block 305 (after low-power exit) before any memory transactions with respect to protected resources are allowed. Depending upon the number of hardware firewalls involved, a fixed DBD control access policy can take as much thirty times more time compared to when systems and methods described herein are implemented, such that the tunneling rule(s) of an adaptive DBD control access policy 208 allows default access to specific domains much prior to completion of the full context restore.

To make the overall mechanism (re)test friendly and secure, adaptive DBD control access policy 208 may be designed to match the behaviors expected during various phases of a microchip's lifecycle and/or early debug stages, for example, in a way that allows to open more access paths during manufacturing lifecycle stage (but still restrict access to any secrets) while blocking all accesses during a customer lifecycle stage, the stage at which the device is deployed in the customer's product in the field. In some implementations, the current lifecycle stage of microchip 100 may be indicated bit(s) 205 in device fuses/OTP memory 202.

In many implementations, microchip 100 may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A System-on-Chip (SoC), comprising:
   a plurality of core domains; and
   a memory coupled to the plurality of core domains through a hardware firewall, wherein the hardware firewall is configured to enforce an adaptive Deny-By-Default (DBD) access policy in response to an event, wherein the adaptive DBD access policy is generated based, at least in part, upon a DBD configuration state, the DBD configuration state associated with a tunneling rule.

2. The SoC of claim 1, wherein the plurality of core domains comprises a real-time processing domain and an application domain.

3. The SoC of claim 2, wherein the memory is shared between the real-time processing domain and the application domain.

4. The SoC of claim 1, wherein the hardware firewall comprises a Resource Domain Controller (RDC).

5. The SoC of claim 1, wherein the event comprises a reset or low-power mode exit event.

6. The SoC of claim 5, wherein the hardware firewall is configured to enforce the adaptive DBD access policy beginning at: (a) a time of negation of the reset, or (b) a time of a low-power mode exit event.

7. The SoC of claim 6, wherein the hardware firewall is configured to enforce the adaptive DBD access policy until an access policy programmed by a Root-of-Trust (ROT) device is in effect.

8. The SoC of claim 1, wherein the tunneling rule specifies that a core domain be granted access to at least a region of the memory.

9. The SoC of claim 8, wherein first tunneling rule further specifies that the core domain be running in a secure mode of operation.

10. The SoC of claim 9, wherein each of the plurality of tunneling rules is mapped to a different lifecycle stage of the SoC.

11. The SoC of claim 1, wherein another adaptive DBD access policy based, at least in part, upon another DBD configuration state.

12. The SoC of claim 11, wherein the other DBD configuration state is associated with another tunneling rule.

13. The SoC of claim 12, wherein the other tunneling rule specifies that another core domain be granted access to the memory.

14. A circuit, comprising:
    an access control policy generator configured to produce an adaptive Deny-By-Default (DBD) policy, wherein the adaptive DBD access policy is generated based, at least in part, upon a DBD configuration state, the DBD configuration state associated with a tunneling rule; and
    a hardware firewall coupled to the access control policy generator, the hardware firewall configured to enforce the adaptive DBD policy.

15. The circuit of claim 14 wherein the adaptive DBD policy identifies a core domain as having access to a hardware resource based, at least in part, upon a DBD configuration state stored in a One-Time Programmable (OTP) memory.

16. The circuit of claim 15, wherein in response to the circuit having reached a subsequent lifecycle stage, the hardware firewall is configured to enforce another adaptive DBD policy, and wherein the other adaptive DBD policy identifies another core domain as having access to the hardware resource based, at least in part, upon another DBD configuration state stored in the OTP memory.

17. In an electronic chip, a method comprising:
    storing an indication of a first Deny-By-Default (DBD) configuration state in a One-Time Programmable (OTP) memory, wherein the first DBD configuration state is usable by a hardware firewall to enforce a first DBD access control policy, wherein the first DBD configuration state is associated with a first tunneling rule; and
    changing the stored indication to a second DBD configuration state, wherein the second DBD configuration state is usable by the hardware firewall to enforce a second DBD access control policy, wherein the second DBD configuration state is associated with a second tunneling rule.

18. The method of claim 17, further comprising changing the stored indication in response to a determination that the electronic chip has transitioned between discrete lifecycle stages.

* * * * *